(12) United States Patent
Häggander et al.

(10) Patent No.: US 6,308,514 B2
(45) Date of Patent: Oct. 30, 2001

(54) ROCKET ENGINE NOZZLE

(75) Inventors: Jan Häggander, Trollhättan; Lars-Olof Pekkari, Ytterby, both of (SE)

(73) Assignee: Volvo Aero Corporation, Trollhätan (SE)

( * ) Notice: Subject to any disclaimer, the term of this patent is extended or adjusted under 35 U.S.C. 154(b) by 0 days.

(21) Appl. No.: 09/750,764

(22) Filed: Jan. 2, 2001

Related U.S. Application Data

(63) Continuation of application No. 09/125,075, filed as application No. PCT/SE96/00176 on Feb. 12, 1996, now Pat. No. 6,176,077.

(51) Int. Cl.$^7$ .................................................... F03H 5/00
(52) U.S. Cl. .................................................................. 60/204
(58) Field of Search ........................................ 60/271, 204

(56) References Cited

U.S. PATENT DOCUMENTS

| | | | |
|---|---|---|---|
| 3,292,865 | * 12/1966 | Short et al. | 239/265.25 |
| 3,305,177 | * 2/1967 | Fage | 60/271 X |
| 4,707,899 | * 11/1987 | Singer | 60/271 X |
| 5,343,698 | * 9/1994 | Porter et al. | 60/271 |

* cited by examiner

*Primary Examiner*—Charles G. Freay
*Assistant Examiner*—David J. Torrente
(74) *Attorney, Agent, or Firm*—Ostrolenk, Faber, Gerb & Soffen, LLP

(57) ABSTRACT

A rocket engine nozzle with an outlet portion having a curved profile in axial section. In order to control the flow separation occurring within the nozzle outlet, the radius of the outlet portion, in axial section, varies circumferentially in length.

4 Claims, 3 Drawing Sheets

ROCKET ENGINE NOZZLE

Figure 1:
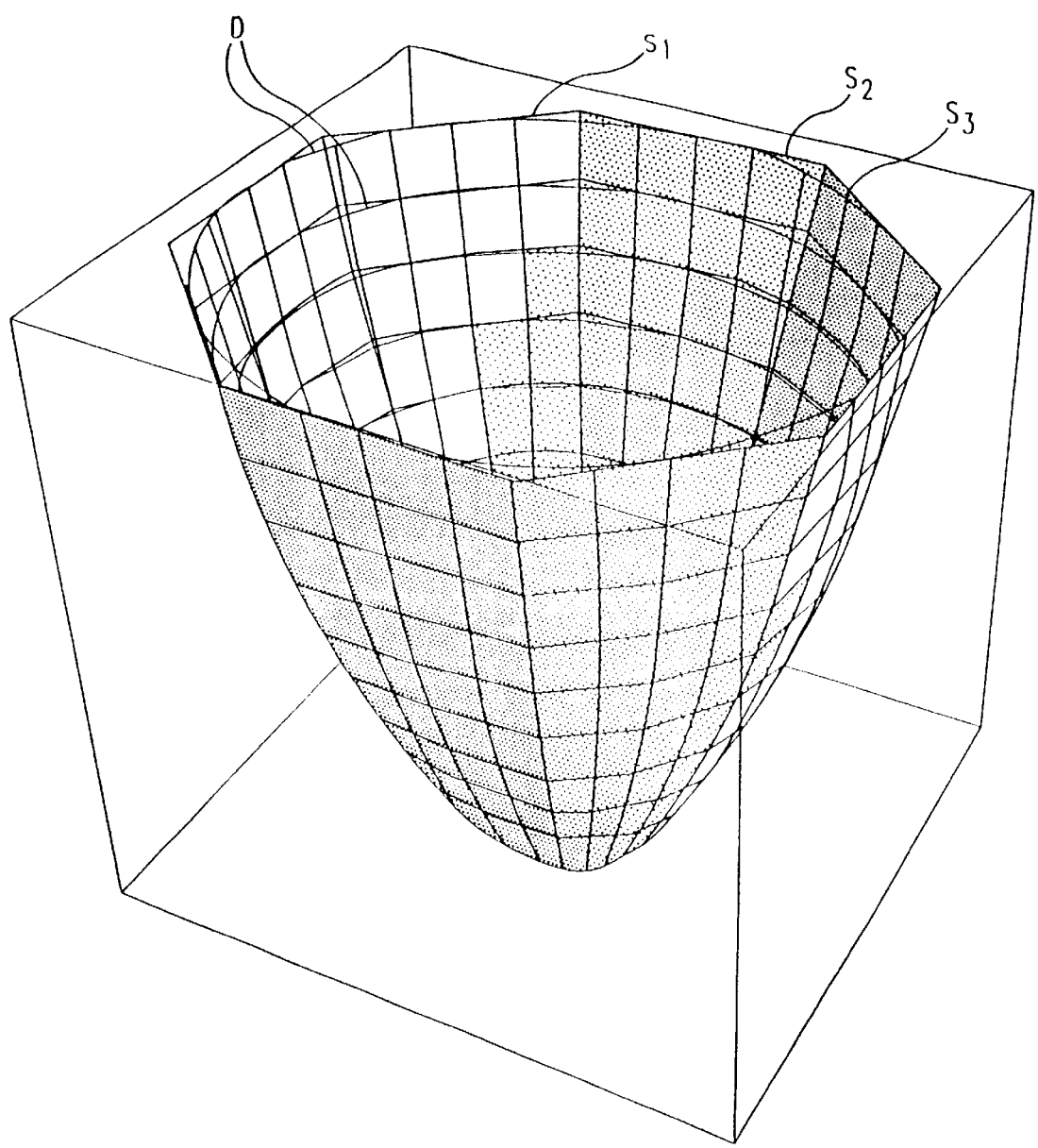

This is a continuation of application Ser. No. 09/125,075, filed Oct. 28, 1998 now U.S. Pat. No. 6,176,077 which is a 371 of PCT/SE96/00176 filed Feb. 12, 1998.

The present invention refers to a rocket engine nozzle with an outlet portion or thrust chamber having a curved profile in axial section.

During start-up and stop transients in sea-level rocket engines significant dynamic Loads usually occur. These loads are generally attributed to the disordered flow characteristics of the flow during flow separation.

The outlet portion of nozzles for liquid propellant rocket engines often operate at conditions where the main jet exhausts into a non-negligible ambient pressure. Examples of such rocket engines are large liquid propellant sea-level rocket engines for boosters and core stages that are ignited at sea-level and upper stage rocket engines ignited during stage separation.

Dynamic loads are due to the instationary nature of the thrust chamber flow during star and stop transients and during steady-state operation with separated flow in the nozzle. The rules for and effects of such flow separation have been studied and presented at the 30th AIAA/ASME/SAE/ASEE Joint Propulsion Conference, June 1994, Indianapolis, Ind., USA in a paper "Aero-elastic Analysis of Side Load in Supersonic Nozzles with Separated Flow", Volvo Aero Corporation, to which may be referred. The dynamic loads are generally of such a magnitude, e.g. of the order of 50–100 kN, that they present life-limiting constraints for the design of thrust chamber components. These constraints result in higher weight for thrust chamber structural elements. Furthermore the largest possible area ratio that can be used on the nozzle extension is limited by the requirement of attached flow during steady-state operation.

The final consequences of the dynamic loads are constraints on the overall performance-to-weight ratio of the thrust chambers and a subsequent limitation of the amount of cay-load that can be delivered into orbit by the rocket launcher.

For eliminating the drawbacks of prior nozzles a great number of techniques have been suggested which all, however, have turned out to have themselves significant drawbacks in various respects. The main difficulties refer to the function, performance, cooling and reliability.

Thus traditional bellshaped nozzles give a limited function and substantial start and stop transient loads. A dual bell nozzle also suffers from severe transient dynamic loads. External expansion nozzles have been suggested but not been sufficiently tested. A bell nozzle equipped with trip rings reduces dynamic loads but with too large a performance loss. Said nozzles also suffer from difficult cooling problems. Finally, extendible nozzles and ventilated nozzles have been suggested but both require mechanisms with functions that are not possible to verify prior to flight.

The main object of the present invention now is to suggest a rocket engine nozzle structure which provides for an advantageous flow control within the diverging outlet portion of the nozzle which makes it possible to reduce the weight of rocket engine nozzle and to gain increased performance.

According to the invention this is achieved by a nozzle which is substantially distinguished in that, circumferentially, said outlet portion in axial section has a radius, the length of which varies. Preferably, the radius length varies periodically and most preferably periodically so as to create a polygonal circumferential shape of the nozzle.

According to the invention, the separated flow can be controlled satisfactorily by this very limited non-axisymmetric modification of the nozzle wall contour. This modification exhibits no significant negative effects on performance, reliability, cooling and manufacturing aspects of the nozzle outlet portion.

The invention thus provides for the design a sea-level rocket engine nozzle with significantly higher vacuum performance through a larger nozzle area ratio and reduced weight.

Figure 2:
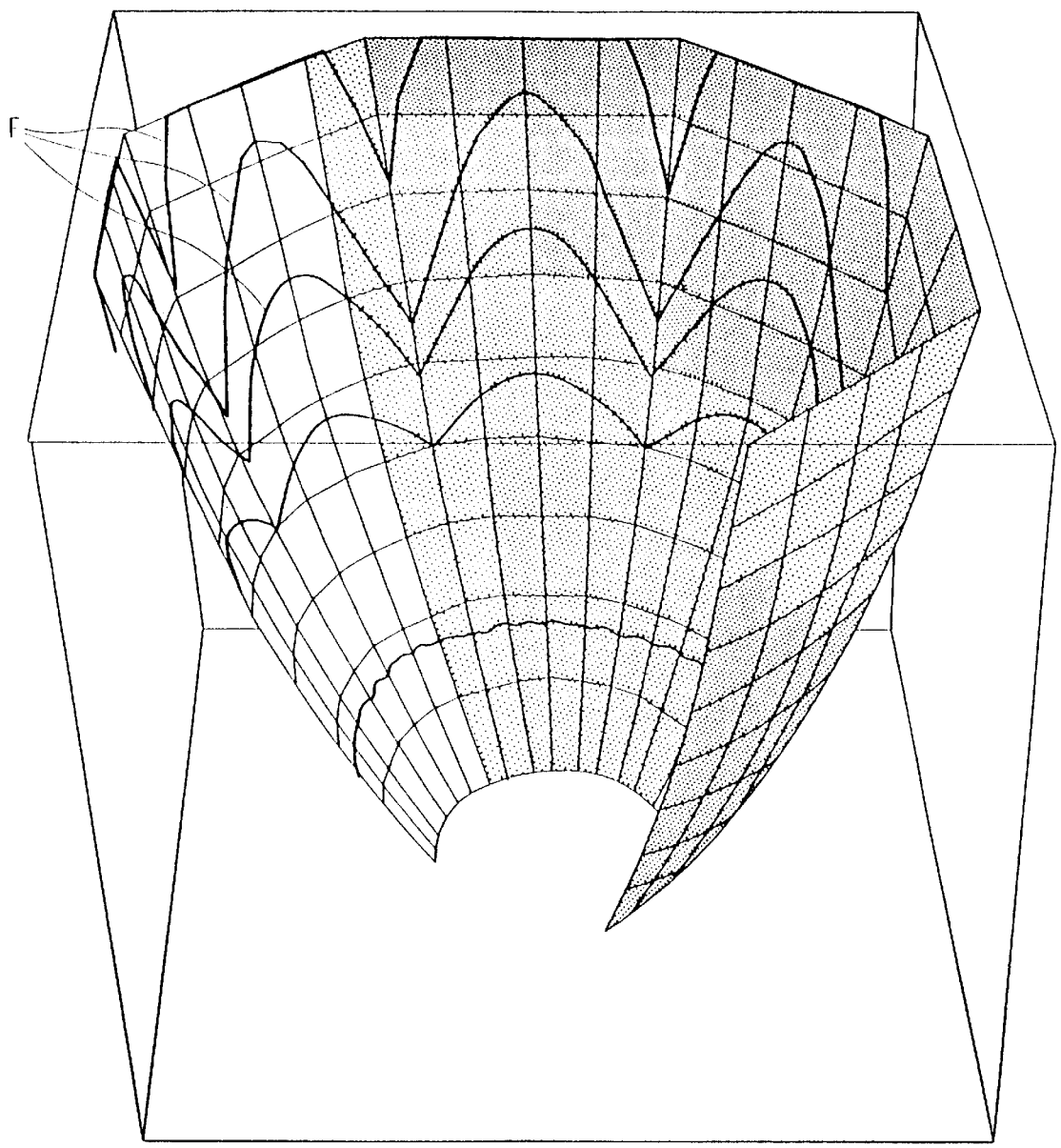
Figure 3:
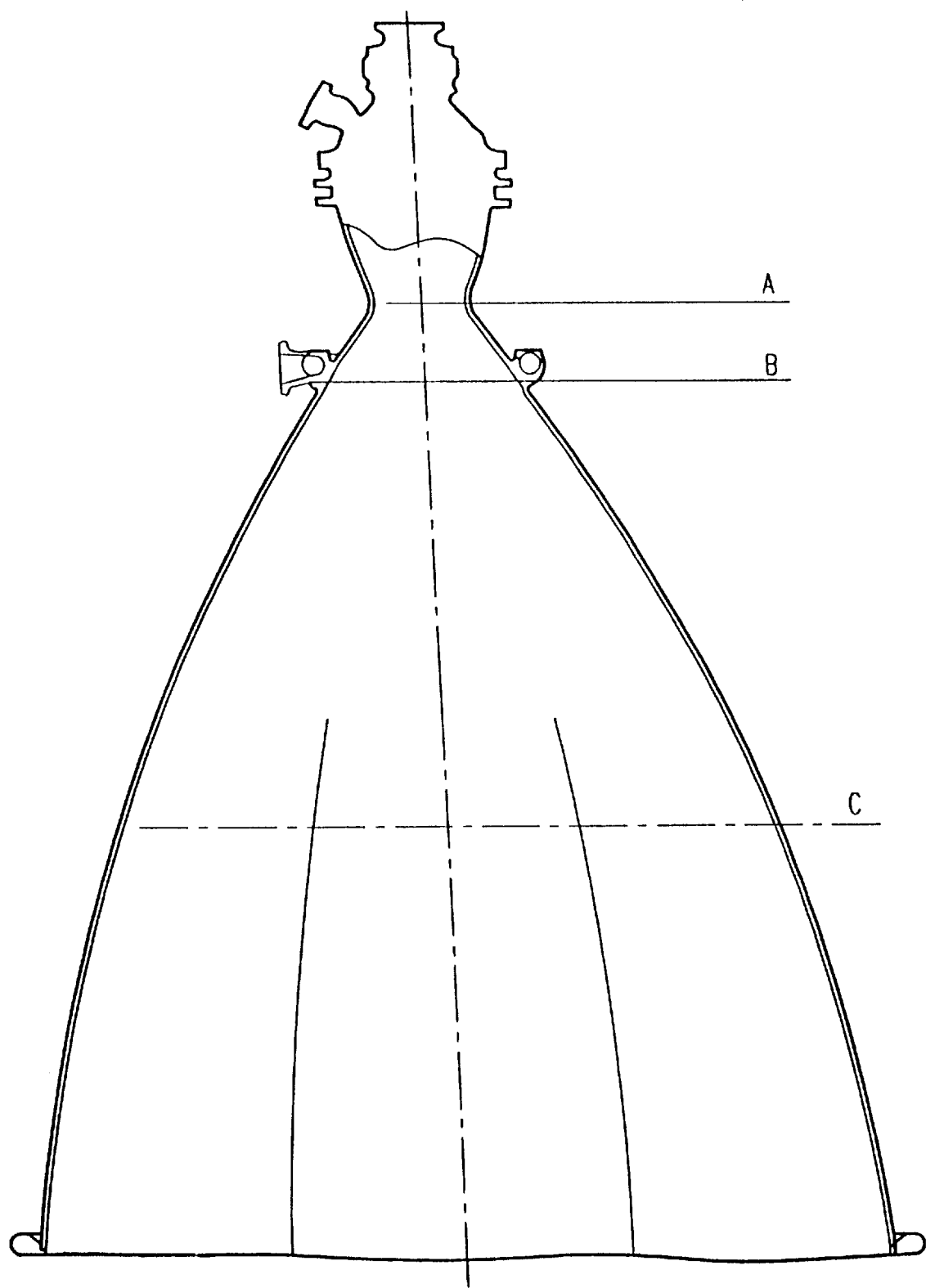

The invention will be further described below with reference to the accompanying drawing, in which FIG. 1 illustrates in a perspective view the diverging outlet portion of a nozzle according to the invention, FIG. 2 illustrates a similar but opened or broken-up perspective view of a similar nozzle, and FIG. 3 is an axial section of a rocket engine with an outlet portion according to the invention.

With reference to FIG. 3 the invention will be described applied to a known sea-level rocket engine. From the minimum nozzle area A in which the exhaust gases have sonic speed, the diverging or outlet portion of the nozzle can be considered to extend from the level B having an inlet area ratio of 5. Under many conditions such as in the moments of starting and stopping and when atmospheric pressure resides, the flow will separate from the inner wall of said diverging portion of the nozzle. This phenomenon occurs spontaneously and randomly and causes instationary gas loads in transversal direction. Said phenomenon will imply restrictions as to the expansion ratio in the outlet portion and the length of the latter along which the requirement of attached flow during steady state operation can be fulfilled. According to the invention, a new nozzle shape is suggested which will provide for an effective control of the flow separation in a reliable way such that the expansion ratio might be increased and thus the power of the rocket engine without the flow separation phenomenon causing unacceptable side-loads.

The present invention, leaving the prior axisymmetric shape of the nozzle wall and having the radius varying in length circumferentially, and preferably to form a polygonal contour, will drastically improve the behaviour of the movements of the flow separation line and reduce t he side-loads and hence allow a higher expansion ratio.

In FIG. 1 has been illustrated only the diverging or outlet portion of the inventive nozzle. In said Figure, the axisymmetric contour of the nozzle portion has been modified from the prior pure circular shape indicated by e.g. lines D, by letting, in accordance with the invention, the radius length vary periodically and preferably so as to form a polygon with e.g. eight sides S1, S2 . . . The polygon being circumscribed the circular line D, an area augmentation of maximum e.g. 6% can be achieved.

In a preferred embodiment, the contour at the inlet of said diverging nozzle portion, i.e. at the level B, see FIG. 3, will be circular, thus with constant length of the radius, and the radius length then starting progressively to vary with increasing distance axially from the level B and to reach its greatest variations close to the end of the diverging nozzle portion.

In FIG. 2 the perspective view of the nozzle has been broken in order to show the flow separation lines F. From said Figure it is evident that the flow separation lines will form curved portions extending from each corner of the polygonal contour and being curved downstream to about the center line of each polygon side. This implies that the flow separation can be effectively controlled and the detrimental side-loads avoided almost entirely. The inventive polygonal con tour will thus induce a non-axisymmetric pressure distribution of the inner wall surface of the nozzle outlet portion. In FIG. 2, the lines of flow separation have been illustrated for a set of chamber pressures during a start transient. Like the embodiment shown in FIG. 1, also in this embodiment the polygonal shape has eight (8) sides and provides an area augmentation by 6% over the circular area circumscribed by the polygon.

The number of sides in the polygon can be varied from 5 to 15, 8, 10 and 12 having been subject to tests. In analyses no affects on the performance data have been observed.

As an example, the measures of a prior nozzle might be exemplified as follows, viz.:

| | |
|---|---|
| Length | 1,8 m |
| Inlet diameter | 0,6 m |
| Exit diameter | 1,8 m |
| Inlet area ratio | 5 |
| Exit area ratio | 45. |

Contrary to this, the measures of a nozzle according to the invention might be exemplified as follows, viz.:

| | |
|---|---|
| Length section A to exit | 3,3 m |
| Inlet diameter | 0,6 m |
| Exit diameter | 2,7 m |
| Inlet area ratio | 5 |
| Exit area ratio | 100 |

As can be seen from the above dimensional example the exit area ratio can be increased to 100 and thus provides for a higher expansion ratio and hence improved performance of the nozzle since the separation lines now can be effectively controlled and moved further downstream of the out-let portion of the nozzle to about a level C as illustrated in FIG. 3. This also allows an increase in length of the nozzle outlet portion and improved flow conditions during steady state operation.

What is claimed is:

1. A method of controlling dynamic side loads of jet exhaust gas in a rocket engine nozzle, comprising guiding jet exhaust gas through a rocket engine nozzle having an inner surface with an axis, a curved profile in axial section and a radius having a length with a periodic variation that increases distally along the axis, generating a circumferential polygonal shape, thereby developing a periodic flow separation profile about the circumference of the rocket engine nozzle, wherein said jet exhaust leaves said rocket engine nozzle at an ultimate downstream terminus of a rocket vehicle.

2. The method of claim 1, wherein the flow separation profile induces non-axisymmetric pressure distribution about the inner surface.

3. The method of claim 1, wherein the polygonal shape has between 5 and 15 sides.

4. The method of claim 1, wherein the flow profile curves downstream between successive points of the polygonal shape.

* * * * *